United States Patent [19]
Gates, Jr.

[11] 3,989,067
[45] Nov. 2, 1976

[54] BUOYANT HOSE
[75] Inventor: Charles C. Gates, Jr., Denver, Colo.
[73] Assignee: The Gates Rubber Company, Denver, Colo.
[22] Filed: Dec. 11, 1974
[21] Appl. No.: 531,659

[52] U.S. Cl. .............................. 138/129; 138/103; 156/143; 428/36; 428/222
[51] Int. Cl.² ........................................ F16L 11/00
[58] Field of Search ........... 138/109, 129, 148, 149, 138/103; 156/143; 161/127, 139; 428/35, 36, 178, 179, 222

[56] References Cited
UNITED STATES PATENTS

| | | | |
|---|---|---|---|
| 1,939,872 | 12/1933 | Bedur | 138/109 X |
| 2,733,176 | 1/1956 | Balis | 138/109 |
| 3,117,596 | 1/1964 | Kahn | 138/129 X |
| 3,119,415 | 1/1964 | Galloway et al. | 138/109 X |
| 3,122,140 | 2/1964 | Crowe, Jr. | 128/296 |
| 3,226,285 | 12/1965 | Iovenko | 161/72 |
| 3,257,263 | 6/1966 | Miller | 428/160 |
| 3,295,557 | 1/1967 | Christiansen | 138/109 X |

FOREIGN PATENTS OR APPLICATIONS

| | | |
|---|---|---|
| 905,766 | 9/1962 | United Kingdom ............... 138/129 |
| 1,361,215 | 7/1974 | United Kingdom |

Primary Examiner—George F. Lesmes
Assistant Examiner—Henry F. Epstein
Attorney, Agent, or Firm—H. W. Oberg, Jr.; Raymond Fink; Curtis H. Castleman, Jr.

[57] ABSTRACT
A hose having a cover and carcass reinforced tube between which are disposed successive plies of spiralled multiple-end tubing and preferably a cellular foam matrix, the successive tubing plies generally nesting with each other.

7 Claims, 7 Drawing Figures

BUOYANT HOSE

BACKGROUND OF THE INVENTION

The invention relates to flexible pipes and tubular conduits, but more particularly, the invention relates to flexible buoyant hose which includes distinct plies of spirally extending material.

Special purpose hoses such as buoyant hose typically include a tube, cover and reinforcement. Additional structure is usually needed to give the hose desired buoyancy. For example, floats may be attached to a hose or as in some more preferred hose constructions, integral float chambers are included.

One type of integral float chamber includes one ply of one or more pieces of tubing helically spiralled around a tube at substantially the same diameter. The helically extending float chamber may be filled with cellular material such as disclosed in U.S. Pat. No. 3,119,415. The cellular material of such a hose substantially reduces the probability of flooding the float chamber.

Examples of buoyant hose with a single ply of spirally extending tubular chambers not filled with foam are disclosed in U.S. Pat. No. 3,117,596 and British Pat. No. 1,361,215. Such single ply constructions inherently introduce a possibility of reduced buoyancy capability over the expected life of the hose.

The float or tubing diameter must be quite large relative to the size of the tube to effect a chamber having sufficient buoying capability when a single ply of spiralled tubing is used. The numbers of tubes which can be used in a single ply to effect buoyancy are quite few. For example, one spiralled piece of tubing may be used which is disclosed in the U.S. Pat. No. 3,119,415 or up to twenty pieces of tubing may be used as disclosed in the U.S. Pat. No. 1,361,215. Hose buoyancy cannot be achieved by using more tubing in a single ply because the effective specific gravity of such tubing increases as the diameter thereof decreases.

Large diameter float tubing is more subject to collapse than smaller diameter tubing; it is also easier to flood than smaller diameter tubing. This contributes to possibility of losing hose buoyancy. As brought forth above, the problem of flooding large diameter tubing is substantially overcome by filling the tubes with foam.

However, as tubing diameters increase, tubing collapse resistance decreases. Collapse resistance may be enhanced by individually reinforcing the spiralled tubing as is disclosed in the U.S. Pat. Nos. 1,361,215 and 3,117,596.

Empty tubing contributes more to buoyancy than does a foamed filled tubing. However, foam is only necessary to lower the probability of flooding the single ply of large diameter tubing.

Foam disposed exteriorly of single ply tubing is susceptible to collapse because it must support the weight of a floating hose.

SUMMARY OF THE INVENTION

In accordance with the invention, a buoyant hose is provided with integral float chambers that extend spirally throughout the hose. In a preferred embodiment, integral float chambers of several plies of multiple-end tubing are spiralled in the same direction throughout the length of the hose. The successive tubing plies generally nest with each other preferably within a ply of cellular material that is generally in the form of a plurality of helically extending elements. The tubing material has a higher modulus than that of the polymer used in the hose tube, or cellular material.

A primary advantage of the invention is that several plies of relatively small diameter multiple-end tubing may be used to achieve necessary hose buoyancy. The small diameter tubing substantially reduces the possiblity of flooding and loss of buoyancy.

Another advantage of the multiple ply construction is that successive plies of multiple-end tubing are generally longitudinally nested with each other which bolsters the high modulus multiple-end tubing preventing its radial collapse.

Another advantage of the invention is that very lightweight cellular material may be used between the plies of tubing without additional reinforcement to prevent the cellular material from collapsing.

Another advantage of the invention is that its construction lends itself to a process where bundles of multiple-end tubing may be rapidly spiralled around a hose tube.

An object of the invention is to provide a hose construction where the probability of flooding integral chambers to a point causing hose sinking is substantially reduced.

These and other objects or advantages of the invention will be apparent after reviewing the drawings and description thereof wherein.

DESCRIPTION OF THE PREFERRED EMBODIMENT

Figure 1:
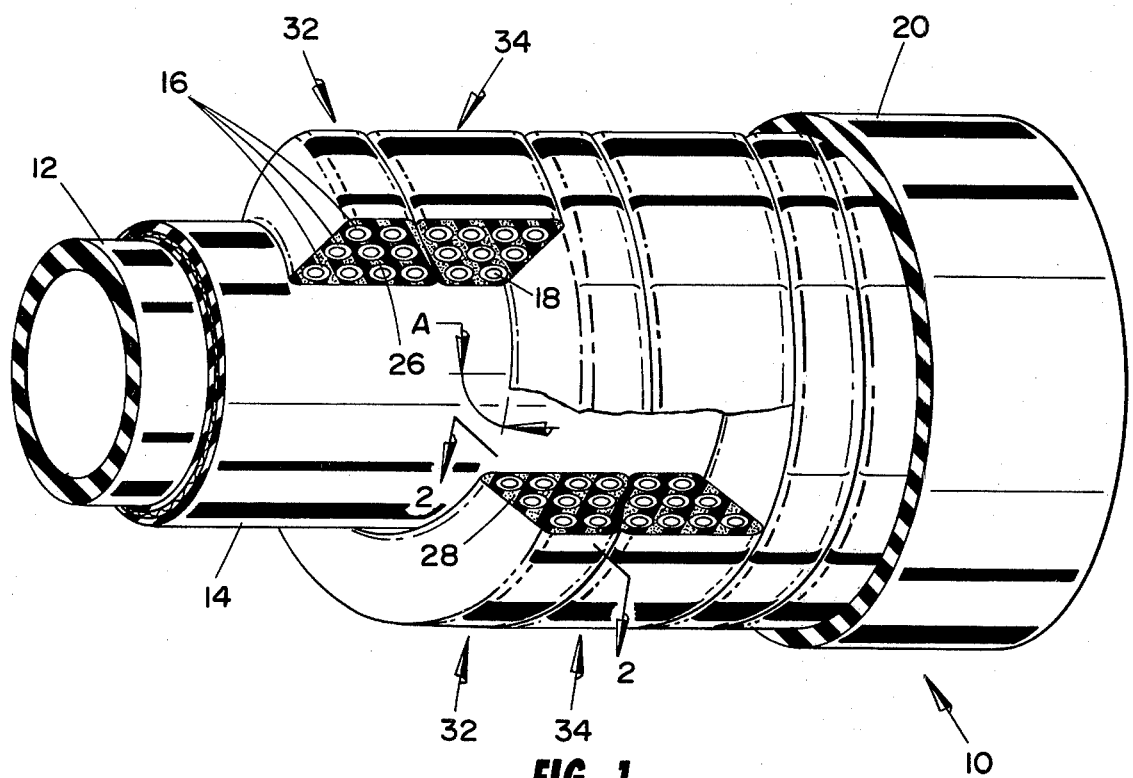
FIG. 1 is a view of an uncured hose showing integral float tubing of the invention applied in bundles to a carcass reinforced tube.
Figure 2:
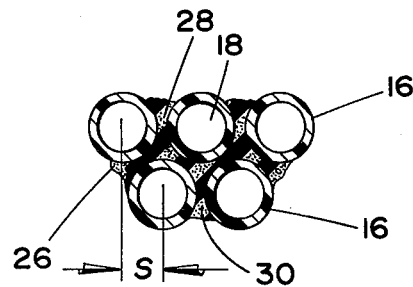
FIG. 2 is an enlarged view taken along the lines 2—2 of FIG. 1.
Figure 3:
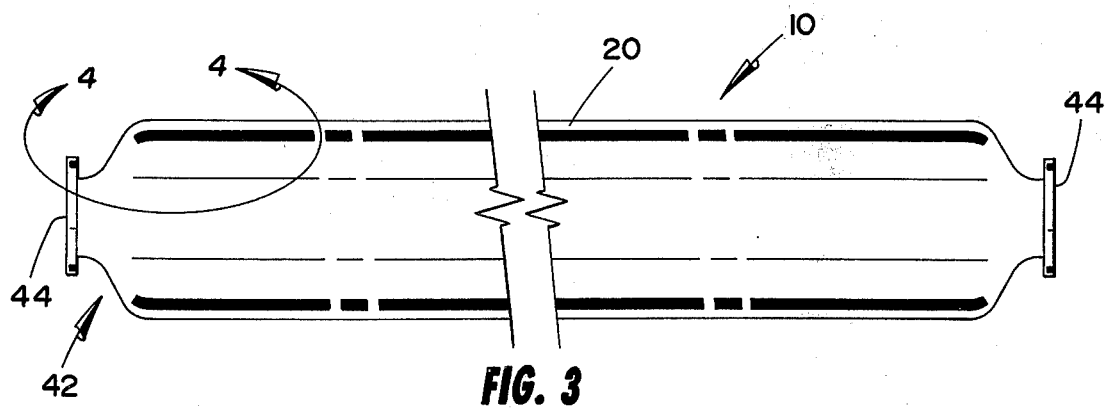
FIG. 3 is a view showing a curved hose assembly of the invention.
Figure 4:
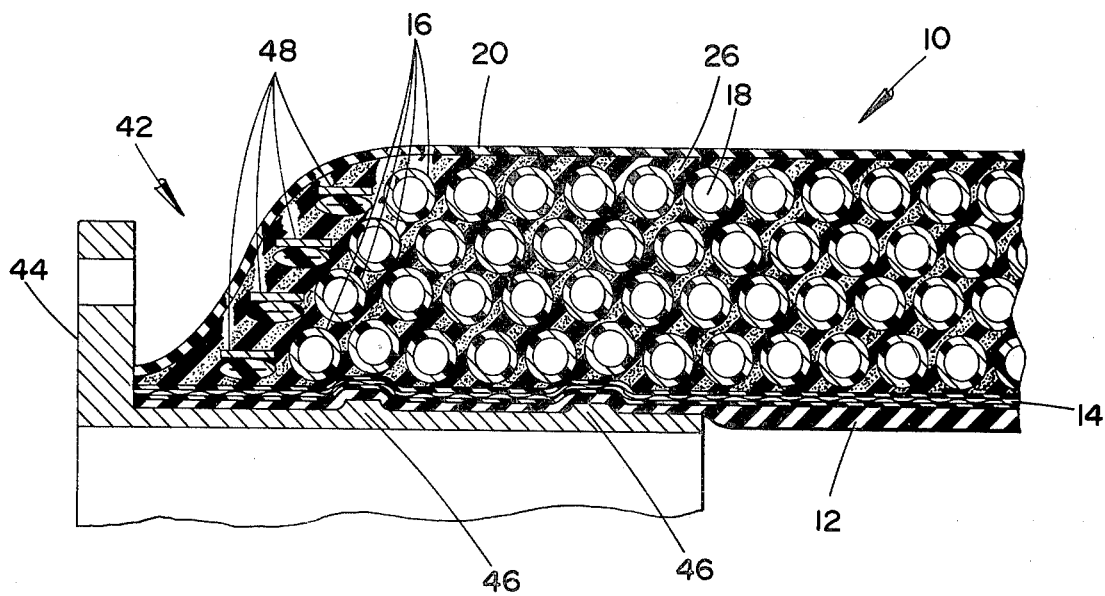
FIG. 4 is a cutaway side view taken generally along the lines 4—4 of FIG. 3.
Figure 5:
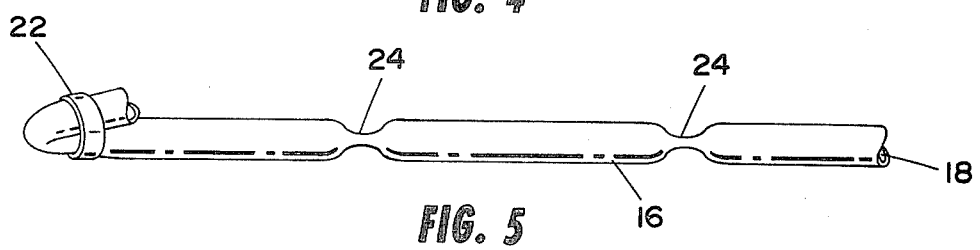
FIG. 5 is an axial view showing a piece of tubing of the invention.

Referring to FIGS. 1–3, a buoyant hose 10 is provided according to a preferred embodiment of the invention. The hose includes a tube 12 reinforced with a carcass, a plurality of plies or layers of multiple-end tubing, consisting of a series of tubes, which define integral float chambers 18, and a cover 20. The tube and cover are of typical construction where elastomeric material such as where natural or synthetic rubbers or blends thereof are chosen to be compatible with the material that is conveyed or transferred by the hose. A carcass reinforcement of any known construction is used to reinforce the tube or cover. Such carcass reinforcement 14 may include spiralled wire, spiralled cord fabric, bias cut fabric, or the like. For the purpose of this disclosure, the term "carcass reinforcement" is used to refer to such typical constructions that are designed to strengthen the hose to control hose twisting, elongation, and radial expansion or contraction.

The integral float chambers 18 are defined by the successive plies of spiralled multiple-end hollow tubing 16. The tubing 16 is wound around the tube 12 at a high helical angle A such as between 60° and 85°. Successive plies of tubing are axially spaced S from each other at a pitch which allows the tubing of successive plies to substantially "nest" within the troughs or valleys defined by each other as particularly illustrated in FIG. 2.

The modulus of the tubing 16 is generally from two to four times the modulus of the elastomeric material selected for the tube 12 or cover 20. The tubing material is selected to have good radial collapse resistance, hoop collapse resistance and flexibility. Suitable tubing materials include blocked polyester thermoplastic elastomers such as Hytrel as manufactured by duPont, nylon, polyurethane or the like. Radial collapse resistance of the tubing is required so that the integral float chambers will not individually collapse when the hose is in use. Tubing hoop strength aids in radially reinforcing the tube for high pressure or suction hose applications. Flexibility, of course, is required so that the tubing may be spiralled during the manufacturing process and to insure that a completed hose has the necessary axial flexibility for its intended use.

The diameter and wall thickness of the tubing 16 affect its radial collapse resistance, void volume, and hoop strength. Void volume is important in establishing the buoyancy effected by the tubing. For example, tubing material, such as Hytrel, has a specific gravity of 1.2. By varying the wall thickness of the tubing and its diameter, the effective specific gravity of the tubing, including the trapped air space, may be reduced to 0.25.

The thermal properties of the tubing are also considered in its selection. The material must remain flexible but intact over various temperature ranges. For example, the melting temperature of a thermoplastic tubing must be higher than the vulcanization temperature of the rubber used in construction of the tube and cover.

The number of plies and diameter of the tubing are chosen to achieve a desired buoyancy for the completed hose. Normally, between four and ten plies of tubing have proven satisfactory for use in oil suction and discharge hoses using carcass reinforced tube as will be illustrated in a later example.

Each piece of tubing 16 defines at least one integral float chamber 18. The ends of the tubing may be sealed 22 such as by plugging, kinking, melting, or the like. Each piece of tubing may also be heat-sealed 24 at spaced points to increase the number of individually sealed chambers within each piece of tubing.

The several plies of multiple-end tubing define the major portion of the hose integral float system. Another important part of the integral float system of the preferable embodiment includes cellular or foam material 26 interpositioned between successive tubing plies. As particularly shown in FIG. 2, a majority of the foam fills a generally triangular cross-sectional space between the nested successive plies of tubing. The foam 26 extends throughout the hose substantially as a plurality of interconnected helically extending elements 28.

The foam is preferably of the closed cell type and may have a specific gravity range of generally 0.2 to 0.8. The helically extending foam elements advantageously define a portion of the integral float system which is not easily collapsed. The foam may be of any suitable elastomeric material such as natural or synthetic rubber, polyurethane, polyvinylchloride or the like. One important function of the foam is to substantially lower the probability of flooding the space between juxtaposed tubes should a leak in the cover develop. Of course, a solid elastomer, such as gum rubber, may be substituted for the foam with a corresponding decrease in hose buoyancy.

Another important function of the helically extending elements 28 between the tubing plies is to longitudinally support each individual piece of tubing 16 throughout its length to substantially enhance its collapse resistance.

The interaction of the tubing and cellular material should be noted with particularity. The nesting feature of the successive plies longitudinally supports individual pieces of tubing at several points throughout their length bolstering the tubing to help prevent it from radially collapsing. In turn, the successive tubing plies define a triangulated structure (or void) which shields the helically extending elements 18 and insures against their collapse. The only points where the foam may be somewhat collapsed are at the apexes 30 of each triangular shaped void. This is only a minor portion of the total triangularly shaped area. For an average size float hose of a oil suction and discharge type, the foam material interpositioned between the successive tubing plies may contribute 20 percent or more to the effective buoyancy of the integral float chamber.

Figure 6:
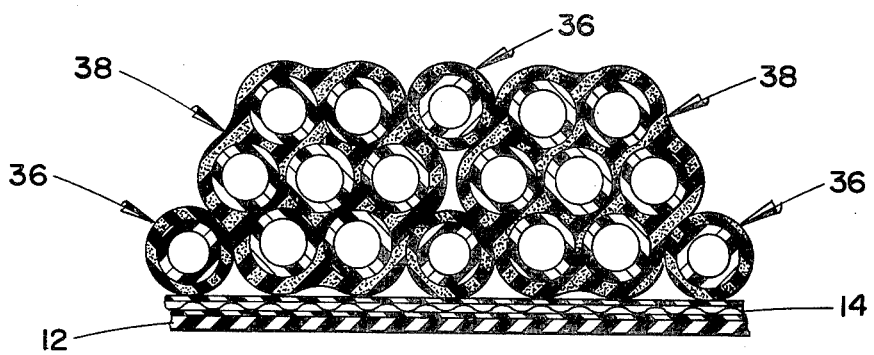
FIG. 6 is a partial cutaway side view showing an alternate tube bundle of the invention positioned over a tube and carcass.
Figure 7:
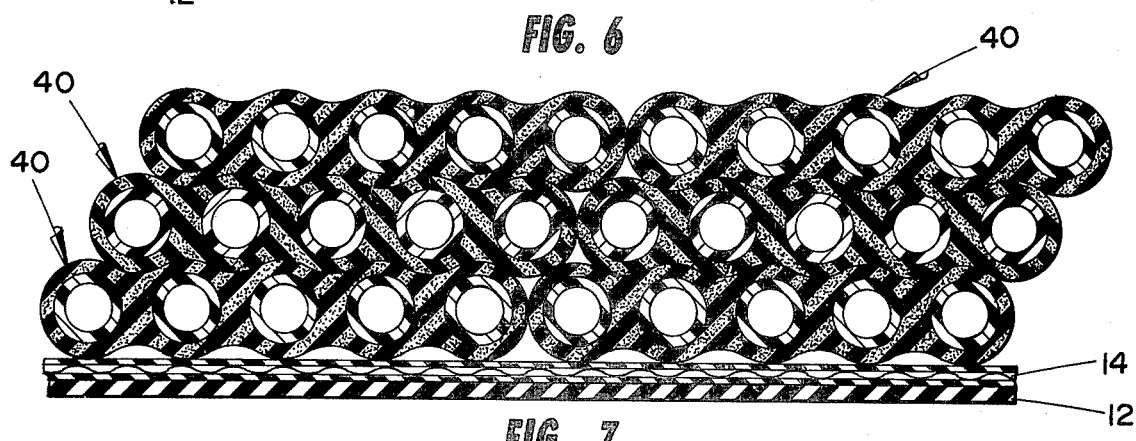
FIG. 7 is a partial cutaway side view showing an alternate tube bundle of the invention positioned over a tube and carcass.

The nested plies of tubing and the cellular foam matrix lend themselves to an advantageous manufacturing process. Bundles 32, 34 of nested tubing may be preassembled in the foam material 28 to have one or several geometric arrangements, such as particularly shown in FIG. 1. The bundles 32, 34 are spirally wrapped around the carcass reinforced tube such that several plies of tubing reinforcement are applied with a minimum number of passes. For example, the tubing bundle 32 may be spiralled around the tube and carcass followed by spiralling of the bundle 34 as exemplified in FIG. 1. Several bundles and plies may be simultaneously applied to the tube because all tubing plies are spiralled in the same direction at generally the same helical angle A. FIGS. 6 and 7 illustrate tubing bundle 36, 38, 40 combinations which may be spiralled around the tube and carcass.

The hose previously described may be preferably used in a buoyant hose assembly 42 that is suitable for use in oil suction and discharge applications. The hose 10 of the assembly is similar to that as previously described and includes a tube 12, carcass reinforcement 14, a plurality of plies of spiralled tubing 16 embedded in preferably a cellular foam 26 matrix, and a cover 20 which optionally may include a carcass for reinforcement. The carcass reinforced tube is positioned over a coupling means 44 that has radial ribs 46. Restraining bands 48 tie-off the tube and successive plies of multiple-end tubing at points juxtaposed the radial ribs. The tie bands prevent the hose from axialy slipping off the coupling means. Additional plies of multiple-end tubing may be desired near each coupling means to provide the necessary buoyancy. The extra plies of tubing may be spiralled individually or in bundles in the manner as previously described. Cellular foam material 26 is positioned between the nested plies of tubing. The cellular foam material may be applied in the form of a calendered stock which includes a blowing agent sensitive to heat. The cover is then positioned over the assembly. The assembly is cured using standard vulcanization techniques. The cellular structure is formed as the blowing agent in the calendered stock is heated. Identity of the bundles 32, 34 is generally lost during curing or vulcanization.

Another advantage of the invention is that several individually sealed integral chambers are available. This substantially decreases the probability of flooding to the point which could cause the hose to sink. Also, the foamed rubber positioned as a helically extending member in the assembly defines integral float systems which are not readily subjected to flooding or collapse.

The foregoing detailed description is made for purpose of illustration only and is not intended to limit the scope of the invention which is to be determined from the appended claims.

What is claimed is:

1. In a buoyant hose of the type having a carcass reinforced tube, integral float chambers, and a cover, the improvement of the integral float chambers comprising:
   at least two successive plies of tubing, each ply of tubing comprising a plurality of individual tubes helically extending in the same direction at generally a constant helical angle and disposed between the carcass reinforced tube and cover to define a plurality of integral float chambers, each successive ply of tubing axially offset from and adapted to substantially nest at a larger radius with its preceding ply of tubing to define successive layers of tubing; and
   a ply of elastomeric material interpositioned between each successive ply of tubing.

2. A hose as set forth in claim 1 wherein the elastomeric material comprises a plurality of interconnected helically extending elements having generally a triangular cross-section.

3. A hose as set forth in claim 2 wherein the interconnected helically extending elements are of a cellular foam material.

4. A hose as set forth in claim 1 wherein the helical angle is generally from 60° through 85°.

5. A hose as set forth in claim 1 wherein tubes of a ply are sealed at spaced points to define an additional plurality of individually sealed float chambers.

6. A buoyant hose assembly comprising:
   a carcass reinforced tube;
   coupling means disposed at each end of the tube;
   at least two successive plies of tubing, each ply of tubing comprising a plurality of individual tubes helically extending in the same direction at generally a constant helical angle over the carcass reinforced tube and defining a plurality of float chambers, each successive ply of tubing axially offset from and adapted to substantially nest at a larger radius with its preceding ply of tubing to define successive layers of tubing;
   a ply of elastomeric material interpositioned between each successive ply of tubing; and
   a cover disposed over said tubing.

7. A buoyant hose assembly comprising:
   a carcass reinforced tube;
   coupling means disposed at each end of the tube; at least two successive plies of sealed tubing, each ply of tubing comprising a plurality of individual tubes helically extending in the same direction over the carcass reinforced tube at generally a constant helical angle and defining a plurality of float chambers, the tubing of each successive ply having an outside diameter which is greater than the axial spacing between tubing of the preceding ply, and each successive ply of tubing axially offset from and adapted to substantially nest at a larger radius with and in relation to its preceding ply of tubing to define successive layers of tubing;
   a ply of elastomeric material interpositioned between each successive ply of tubing; and
   a cover disposed over said tubing.

* * * * *